(12) United States Patent
Syrstad et al.

(10) Patent No.: US 11,650,057 B2
(45) Date of Patent: May 16, 2023

(54) EDGE DETECTION VIA WINDOW GRID NORMALIZATION

(71) Applicant: Honeywell International Inc., Morris Plains, NJ (US)

(72) Inventors: Justin Joseph Syrstad, Brooklyn Park, MN (US); Benjamin Mohr, Plymouth, MN (US); Kevin Sweeney, Minneapolis, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 266 days.

(21) Appl. No.: 16/855,518

(22) Filed: Apr. 22, 2020

(65) Prior Publication Data

US 2023/0113059 A1 Apr. 13, 2023

(51) Int. Cl.
| | |
|---|---|
| *G01S 19/48* | (2010.01) |
| *G01C 21/16* | (2006.01) |
| *G01S 19/40* | (2010.01) |
| *G01S 19/47* | (2010.01) |
| *F01D 9/06* | (2006.01) |
| *F01D 5/18* | (2006.01) |
| *G06T 7/13* | (2017.01) |

(52) U.S. Cl.
CPC .......... *G01C 21/165* (2013.01); *F01D 5/186* (2013.01); *F01D 9/065* (2013.01); *G01S 19/40* (2013.01); *G01S 19/47* (2013.01); *G01S 19/48* (2013.01); *G06T 7/13* (2017.01); *F05D 2260/20* (2013.01); *F05D 2260/204* (2013.01)

(58) Field of Classification Search
CPC ......... G01C 21/165; G06T 7/13; F01D 5/186; F01D 9/065; G01S 19/40; G01S 19/47; G01S 19/48
See application file for complete search history.

(56) References Cited

U.S. PATENT DOCUMENTS

| | | | |
|---|---|---|---|
| 4,914,734 | A | 4/1990 | Love et al. |
| 7,340,099 | B2 | 3/2008 | Zhang |
| 8,320,712 | B2 | 11/2012 | Choi et al. |
| 8,873,883 | B2 | 10/2014 | Zhang et al. |
| 9,083,961 | B2 | 7/2015 | Tanner |

(Continued)

FOREIGN PATENT DOCUMENTS

| | | |
|---|---|---|
| CN | 110288620 A | 9/2019 |
| EP | 2687817 A2 | 1/2014 |

OTHER PUBLICATIONS

Estimation of UAV position with use of thermal infrared images; Silva et al.; 2015 Ninth International Conference of Sensing Technology (Year: 2015).*

(Continued)

*Primary Examiner* — Jonathan R Messmore
(74) *Attorney, Agent, or Firm* — Fogg & Powers LLC

(57) ABSTRACT

In an embodiment, a method is provided. The method comprises extracting, from an image acquired with a first image-capture device, an image portion having dimensions of an extent of a second image-capture device. The method further comprises normalizing a parameter of the image portion. The method further comprises determining at least one edge of at least one object in the image portion; and generating, in response to the determined at least one edge, an edge map corresponding to the image portion.

20 Claims, 10 Drawing Sheets

(56) References Cited

U.S. PATENT DOCUMENTS

| | | | |
|---|---|---|---|
| 9,305,360 | B2 | 4/2016 | Parfenov et al. |
| 9,324,003 | B2 | 4/2016 | France et al. |
| 9,906,717 | B1 | 2/2018 | Plank et al. |
| 10,160,550 | B1 | 12/2018 | Somanath et al. |
| 10,235,577 | B1 | 3/2019 | Avadhanam et al. |
| 10,819,905 | B1 | 10/2020 | Liu et al. |
| 2006/0039623 | A1 | 2/2006 | Chaudhury et al. |
| 2009/0214080 | A1* | 8/2009 | Hamza .................. G06T 7/11 |
| | | | 382/103 |
| 2012/0158280 | A1 | 6/2012 | Ravenscroft |
| 2014/0092217 | A1 | 4/2014 | Tanner |
| 2017/0030722 | A1 | 2/2017 | Kojo |
| 2018/0225989 | A1 | 8/2018 | Elgersma et al. |
| 2019/0051003 | A1 | 2/2019 | Burgett |
| 2020/0160547 | A1 | 5/2020 | Liu et al. |
| 2021/0247166 | A1 | 8/2021 | Wilkinson et al. |
| 2021/0333107 | A1 | 10/2021 | Syrstad et al. |

OTHER PUBLICATIONS

Syrstad, Justin J. et al., "Adaptive Guassian Derivative Sigma Systems and Methods", U.S. Appl. No. 16/855,529, filed Apr. 22, 2020, pp. 1 through 39, Published: US.

Conte et al. "An Integrated UAV Navigation System Based on Aerial Image Matching" IEEEAC Paper #1276, Version I Updated Oct. 23, 2007, pp. 1-10, IEEE.

Reddy et al., "An FFT-Based Technique for Translation, Rotation, and Scale-Invariant Image Registration", IEEE Transactions on Image Processing, Aug. 1996, pp. 1266 through 1271, vol. 5, No. 8, IEEE.

Silva et al., "Estimation of UAV position with use of thermal infrared images", 2015 Ninth International Conference on Sensing Technology, 2015, pp. 828 through 833, IEEE.

European Patent Office, "Extended European Search Report from EP Application No. 21167884.2", from Foreign Counterpart to U.S. Appl. No. 16/855,529, dated Sep. 20, 2021, pp. 1 through 15, Published: EP.

European Patent Office, "Extended European Search Report from EP Appplication No. 21167899.0", from Foreign Counterpart to U.S. Appl. No. 16/855,518, dated Sep. 22, 2021, pp. 1 through 10, Published: EP European Patent Office, "Communication pursuant to Article 94(3) from EP Application No. 21167899.0", from Foreign Counterpart to U.S. Appl. No. 16/855,518, dated May 6, 2022, pp. 1 through 8, Published EP.

U.S. Patent and Trademark Office, "Office Action", U.S. Appl. No. 16/855,529, dated May 9, 2022, pp. 1 through 30, Published: US.

European Patent Office, "Communication pursuant to Article 94(3) from EP Application No. 21167884.2", from Foreign Counterpart to U.S. Appl. No. 16/855,518, dated May 23, 2022, pp. 1 through 10, Published: EP.

U.S. Patent and Trademark Office, "Notice of Allowance", U.S. Appl. No. 16/855,529, dated Sep. 16, 2022, pp. 1 through 12, Published: US.

U.S. Patent and Trademark Office, "Notice of Allowability", U.S. Appl. No. 16/855,529, dated Oct. 26, 2022, pp. 1 through 6, Published: US.

U.S. Patent and Trademark Office, "Notice of Allowability", U.S. Appl. No. 16/855,529, dated Dec. 7, 2022, pp. 1 through 6, Published: US.

\* cited by examiner

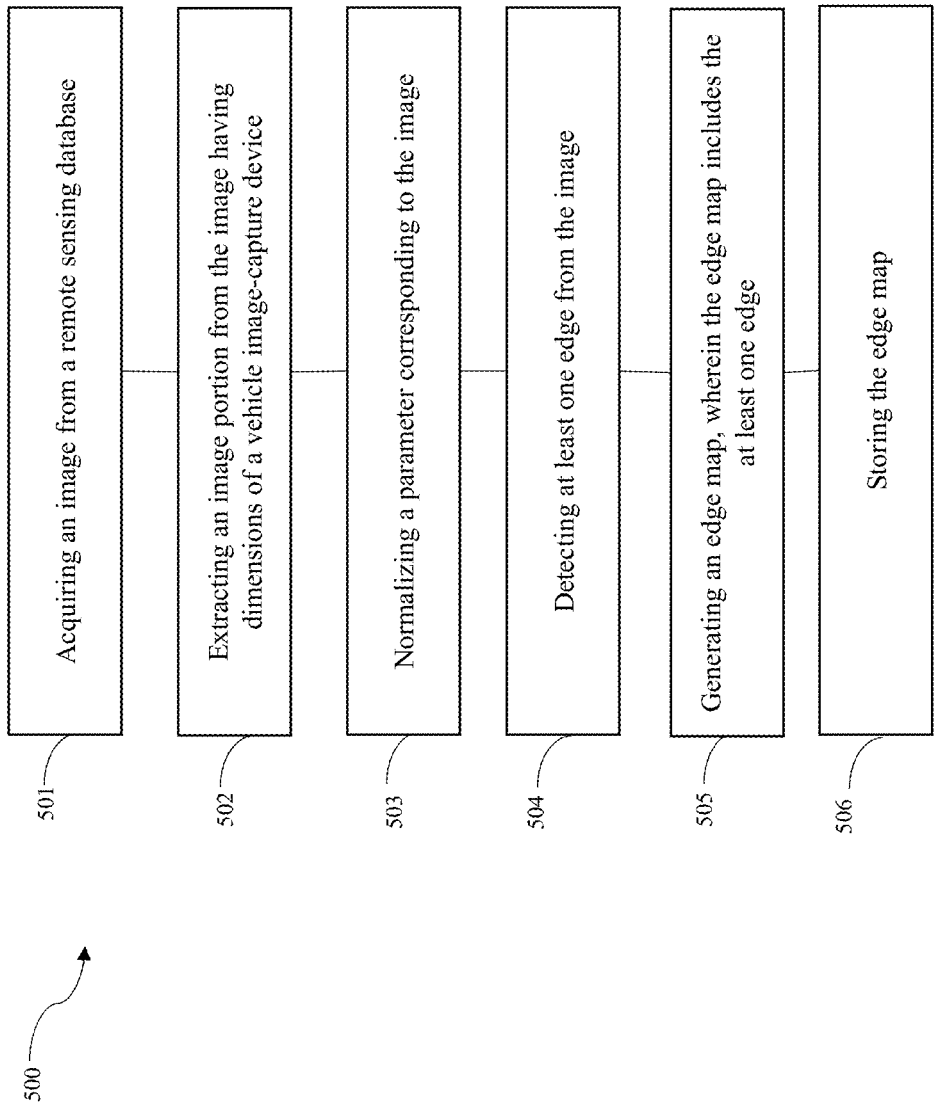

EDGE DETECTION VIA WINDOW GRID NORMALIZATION

CROSS-REFERENCE TO RELATED APPLICATIONS

This patent application is related to U.S. patent application Ser. No. 16/855,529, titled "ADAPTIVE GAUSSIAN DERIVATIVE SIGMA SYSTEMS AND METHODS" filed on Apr. 22, 2020, which is incorporated herein by reference in its entirety.

BACKGROUND

Vehicles, such as manned and unmanned aircraft, can include an onboard Inertial Navigation System (hereinafter "INS") that includes one or more Inertial Measurement Units (hereinafter "IMU") to determine and to track one or more of vehicle position, velocity, and attitude (e.g., pitch, roll, yaw).

A potential problem with using an IMU in an INS is that the IMU can suffer from accumulated error, which leads to the navigation parameters (e.g., position, velocity, attitude) that the INS estimates from the IMU output values "drifting" relative to the actual navigation parameters. That is, the respective difference between each estimated and actual navigation parameter accumulates such that over time, the error between the estimated and actual parameter values increases and can become significant if not corrected on a periodic or other basis.

One way to periodically correct the estimated navigation parameters is to use a Global Navigation Satellite System, such as a Global Positioning System (hereinafter "GPS") to determine accurate values of the navigation parameters, and to feed the accurate, or truth, parameter values to, e.g., a Kalman filter, which alters the coefficients that the filter uses to estimate navigation parameters such as position, velocity, and attitude so that these navigation parameters will, over time, converge to accurate values. That is, the Kalman filter uses the GPS values not only to correct the estimated navigation parameters at one time, but to make more accurate the algorithm that estimates the navigation parameters.

Unfortunately, because it may be subject to geographic outages and other times of unavailability caused by, e.g., spoofing or jamming of GPS signals, GPS may, at certain times, be unavailable for use by an INS to correct the estimates made in response to an IMU.

Therefore, a need has arisen for a technique and system that allows for correction, periodic or otherwise, of navigation parameters estimated by an INS in response to navigation data generated by an IMU even when GPS is unavailable.

SUMMARY

In an embodiment, a method includes extracting, from an image acquired with a first image-capture device, an image portion having dimensions of an extent of a second image-capture device, normalizing a parameter of the image portion, determining at least one edge of at least one object in the image portion, and generating, in response to the determined at least one edge, an edge map corresponding to the image portion.

In another embodiment, a non-transient computer-readable medium stores instructions that, when executed by a computing circuit, cause the computing circuit, or another circuit under control of the computing circuit, to extract, from an image acquired with a first image-capture device, an image portion having dimensions of an extent of a second image-capture device, to normalize a parameter of the image portion, to determine at least one edge of at least one object in the image portion. and to generate, in response to the determined at least one edge, an edge map corresponding to the image portion.

In still another embodiment, a database includes an edge map including at least one edge of at least one object in an image portion. The edge map is generated by extracting, from an image acquired with a first image-capture device, the image portion having dimensions of an extent of a second image-capture device, normalizing a parameter of the image portion, determining the at least one edge of the at least one object in the image portion, and generating the edge map in response to the determined at least one edge.

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary, to employ concepts of the various patents, applications and publications as identified herein to provide yet further embodiments. Other features, objects and advantages will be apparent from the description, the drawings, and the claims.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements may be selected, enlarged, and positioned to improve drawing legibility. The particular shapes of the elements as drawn may have been selected for ease of recognition in the drawings. One or more embodiments are described hereinafter with reference to the accompanying drawings in which:

FIG. 5 is a flow chart of a process for generating an edge map in response to images acquired by a vehicle, and for storing the edge map, according to an embodiment.

DETAILED DESCRIPTION

Figure 1:
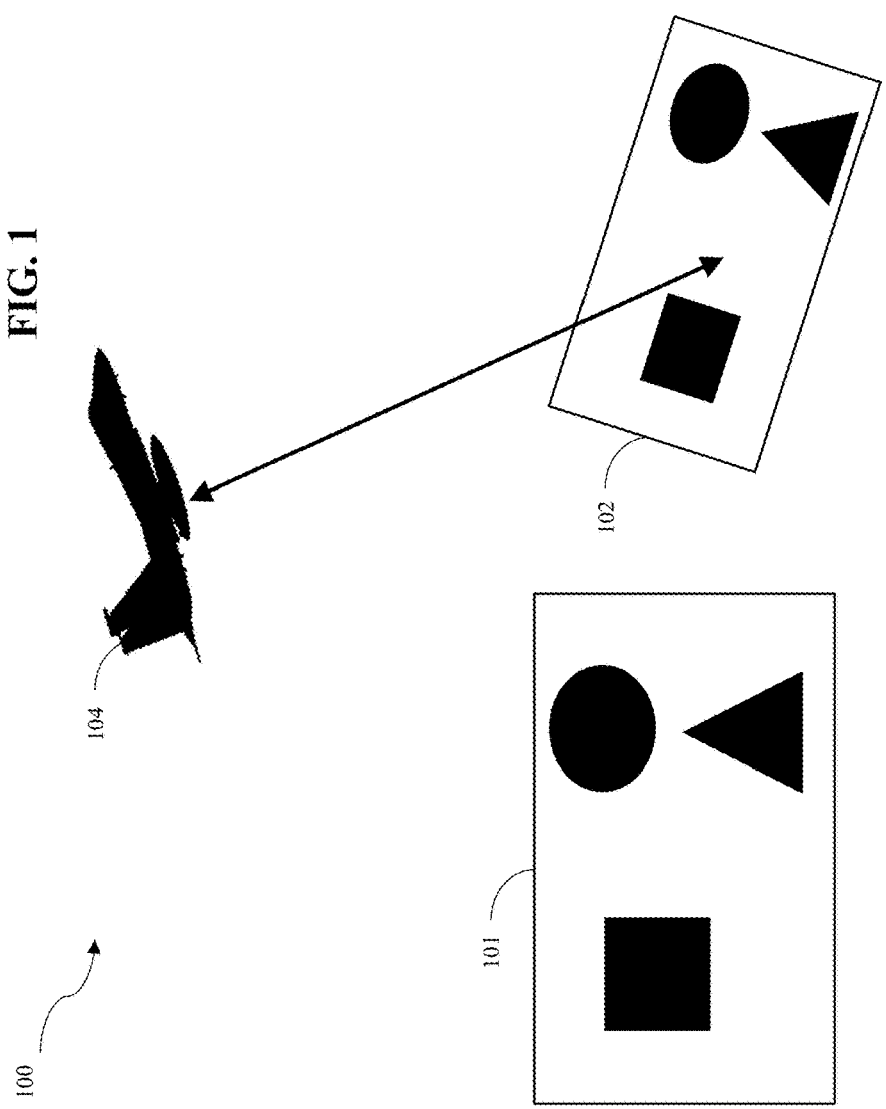
FIG. 1 is a diagram that demonstrates a method for correlating remote sensing images based on the position of a vehicle that acquired the images, according to an embodiment.

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The following disclosure is directed to related improvements in vehicle navigation technology. One set of embodiments relates to normalizing one or more features of an acquired remote sensing image to represent the dimensions of the vehicle's point-of-view, and to storing an edge map that is generated in response to the normalized image. And a second set of embodiments discloses adjusting one or more parameters of an edge-detection algorithm based on the spatial resolutions of the stored edge-map image and an acquired remote sensing image to better detect terrain edges, and using a resulting edge map to correct navigation-tracking errors. As a result, the disclosed embodiments allow for improved accuracy of edge-detection algorithms and navigation systems. Additionally, embodiments disclosed herein allow for increased versatility in navigation systems, as the image-capture device used to acquire remote sensing images from a vehicle, such as an aircraft, not only can include an one or more optical cameras, but also can include, in addition to or instead of one or more optical cameras, other sensors such as infrared thermal imagers and millimeter-wave radar sensors.

Unless otherwise stated, terms in this disclosure are intended to convey their ordinary meaning as understood by those skilled in the art. For example, use of the word "vehicle" would include, but would not be limited to, air vehicles (e.g., aircraft), land vehicles, water vehicles, motor vehicles, and space vehicles. An aircraft is depicted in the accompanying drawings and used throughout the disclosure simply for pedagogical reasons.

The embodiments described herein generally enable the determination of the position of a vehicle based on the comparison (e.g., alignment) of an image taken from an image capture device onboard the vehicle (such as a camera) with a georeferenced, orthorectified remote sensing image of the area below the vehicle. A camera mounted to the vehicle acquires a first image of the area below the vehicle, in which the image has a first set of dimensions (e.g. image size and spatial resolution). Then, using an estimated position of the vehicle via a navigation system (such as an INS), a second image of the area corresponding to the estimated position of the vehicle is acquired externally via a georeferenced orthorectified imagery (remote sensing) database.

A first set of embodiments disclosed herein enable the generation of an edge map database from normalized images obtained externally from the vehicle, each image with dimensions matching dimensions of an image acquired with an image-capture device onboard the vehicle. Furthermore, the first set of embodiments can enable comparison, e.g., in the form of spatial resolution alignment, of an edge map corresponding to a second image taken by an image-capture device onboard the vehicle, which comparison may aid in vehicle-position correction as described below. In an example of the first set of embodiments, using a navigation system onboard the vehicle (e.g. an INS or GNSS system), a first image is obtained from a georeferenced, orthorectified imagery database using the position data gathered by the navigation system. From the first image, an image portion is extracted having the dimensions of an extent of a second image-capture device onboard the vehicle. Said another way, the dimensions of one image (such as a imagery acquired by a satellite) are adjusted to match the dimensions of the extent of a camera onboard the vehicle, where the extent of the camera is the dimensions of the surface area that the image acquired by the onboard camera represents.

One or more image portions (e.g. rectangular grids) from the first, database image are normalized to match, as closely as possible, the spatial resolution of the corresponding image portion(s) of the image acquired by the vehicle image-capture device for better edge detection. An edge detection algorithm (e.g. Canny edge detection) is applied to the normalized image portion. The resulting edge image then can be stored in a georeferenced edge-map database for later use, such as for determining vehicle position as illustrated in the second set of embodiments. Utilizing a georeferenced edge map database enables the determination of the vehicle position via correlating techniques as described below.

A second set of embodiments describe techniques for correcting estimated navigation data based on adjusting one or more parameters of an edge detection algorithm. A first image having a first set of spatial resolutions (e.g. ground sample distances) is acquired externally from the vehicle, such as from a georeferenced, orthorectified imagery database. A second image having a second set of spatial resolutions is acquired from an onboard vehicle camera.

However, the vehicle-acquired image may not represent the same spatial resolution(s) as the image acquired via the georeferenced, orthorectified imagery database. In that instance, the spatial resolution(s) represented by the vehicle-acquired image are adjusted to align with the spatial resolution(s) represented by the database image. The adjustment is made by scaling one or more parameters (e.g. gaussian blurs) of an edge detection algorithm with a ratio of the spatial resolutions between the georeferenced, orthorectified imagery database image and the vehicle-acquired image. Even if the spatial resolutions are not equal, scaling the one or more parameters increases the compatibility of the edges detected in the vehicle-acquired image with the edges in the stored database image. Since the georeferenced, orthorectified imagery database includes position data (such as lateral and longitudinal coordinates and a known reference frame) corresponding to the image, the position of the vehicle (e.g. location, heading) can be more accurately determined from aligning the vehicle-acquired image to the image acquired from the georeferenced, orthorectified imagery database. That is, by aligning the vehicle-acquired image (whose precise reference frame and associated position data is still unknown) with a database image (whose reference frame and position data are known, i.e., georeferenced), the INS onboard the vehicle can make a more precise position determination. This information can then be used to correct estimated position information calculated by the vehicle.

Yet, while possible, directly aligning two images taken with different image-capture devices at different heights/ altitudes (e.g., with different spatial resolutions) above the ground can be a difficult task. Therefore, in an embodiment, an edge image of the vehicle-acquired image is generated and compared with a generated edge map corresponding to the georeferenced, orthorectified imagery database. The edge map of the georeferenced, orthorectified imagery database image can be obtained, for example, via the edge map database described with respect to the first set of embodiments above. Alignment of the aerial edge image with the edge map, rather than the images themselves, may facilitate comparison between the two images (and thus may provide improved position determination). This is because edges tend to be sensor agnostic for a variety of sensors.

FIG. 1 is a set of diagrams that together provide a general overview of the first and second set of embodiments. FIG. 1 includes ground image 101, with shapes (square, triangle, and circle) representing, for purposes of example, significant features (e.g., mountains, bodies of water, fields, forests, man-made structures) in the ground image. Ground image 101 may be acquired, for example, by a satellite and stored in an imagery database (not shown in FIG. 1).

However, a potential problem with using ground-map images for navigation is that the dimensions (e.g., area) of the terrain represented by (e.g., visible in) a ground-map image acquired by a satellite may not be equivalent to the dimensions of the ground represented by an image acquired by a camera, or other image-acquisition device, onboard a vehicle such as an aircraft. Said another way, the spatial resolution of the ground-map image may be different from the spatial resolution of the vehicle-acquired image, where spatial resolution is a measure of how the dimensions of the terrain represented by the image relates to the dimensions of the image. This relationship can be defined as the ground sample distance (GSD) of the image, where the GSD is a representation of the distance (e.g. meters) between two neighboring pixels in an image. An example of such spatial resolution would be an image having a GSD of 10 centimeters (cm), which would correlate to each pixel in the image representing 10 cm on the ground. Throughout this disclosure, the spatial resolution of an image is referred to as the GSD of the image.

Furthermore, the extent of the camera onboard the aircraft represents the dimensions of the section of terrain of which the camera acquires an image. These dimensions can be represented by optical resolution (measured in pixels) and a GSD (measured in distance units). For example, if the optical resolution of a camera is 1000×2000 pixels, and the GSD is 10 meters, then the extent of the camera relative to the terrain is 10 kilometers by 20 kilometers; that is, the image acquired by the camera represents 200 km² of the terrain. So the extent of the camera depends on the size and resolution of the image it acquires (as described below, ground sample distance depends on the height of the camera about the ground when the camera captures the image of the terrain). Therefore, so that the acquired image and database image can be properly aligned to determine navigation parameters, in an embodiment the navigation system compares an image acquired from a vehicle with a portion of an edge map database image having the same GSD and resolution as the acquired image, and therefore, having the same extent as the image-capture device onboard the vehicle. Moreover, a vehicle may not be positioned parallel with the ground or with the same north-south-east-west (NSEW) orientation as the database image; therefore, an image acquired via the vehicle camera may be oriented differently than an image from the terrain-map database. This is illustrated in FIG. 1, where a vehicle 104 acquires a terrain image 102 at an orientation that is different than that of terrain image 101.

The present disclosure describes a technique for adjusting an image parameter of the ground image 101 such that at least a portion of the adjusted ground image has approximately the same extent as the image-capture device onboard the vehicle, and thus has approximately the same spatial resolution and dimensions as the acquired ground image. This is depicted in FIG. 1, where a satellite image of a ground region (e.g., ground image 101) effectively is scaled to have a spatial resolution and dimensions that match, approximately, the spatial resolution and dimensions, respectively, of the image 102 of the same ground region taken with an image-capture device onboard the vehicle 104, and where at least one of the images is re-oriented to align with the other image. The scaled and re-oriented ground image 103 is illustrated as the dashed diagram of FIG. 1. Although the dashed terrain image 103 is shown in FIG. 1 as having dimensions slightly larger than the solid diagram it represents, this enlargement is merely for illustrative purposes and one skilled in the art will recognize that in practice the scaled and re-oriented ground image 103 will have, at least ideally, identical, or substantially identical, spatial resolution, dimensions, and orientation as the ground image 101. The scaled and re-oriented ground image 103 is then compared with the ground image 101 to determine position information corresponding to the aligned ground image 103 based on the known position information associated with ground image 101 as described below in conjunction with FIGS. 6-8. For example, by determining the amount of scaling needed to match the extent of an aircraft-acquired image to the extent of the database image (or vice-versa), and the amount of rotation needed to align the aircraft-acquired image with the database image, a navigation system can determine coordinates, heading, and altitude of the aircraft.

As described above, it may be easier to align edge maps of the respective images instead of the images themselves. Therefore, in an embodiment, an edge map is generated from the vehicle-acquired image and the database image before alignment and comparison of the two maps. In another embodiment, an edge map corresponding to a portion of a georeferenced, orthorectified database image matching the extent of a vehicle image-capture device is stored in an edge-map database before comparison.

Figure 2:
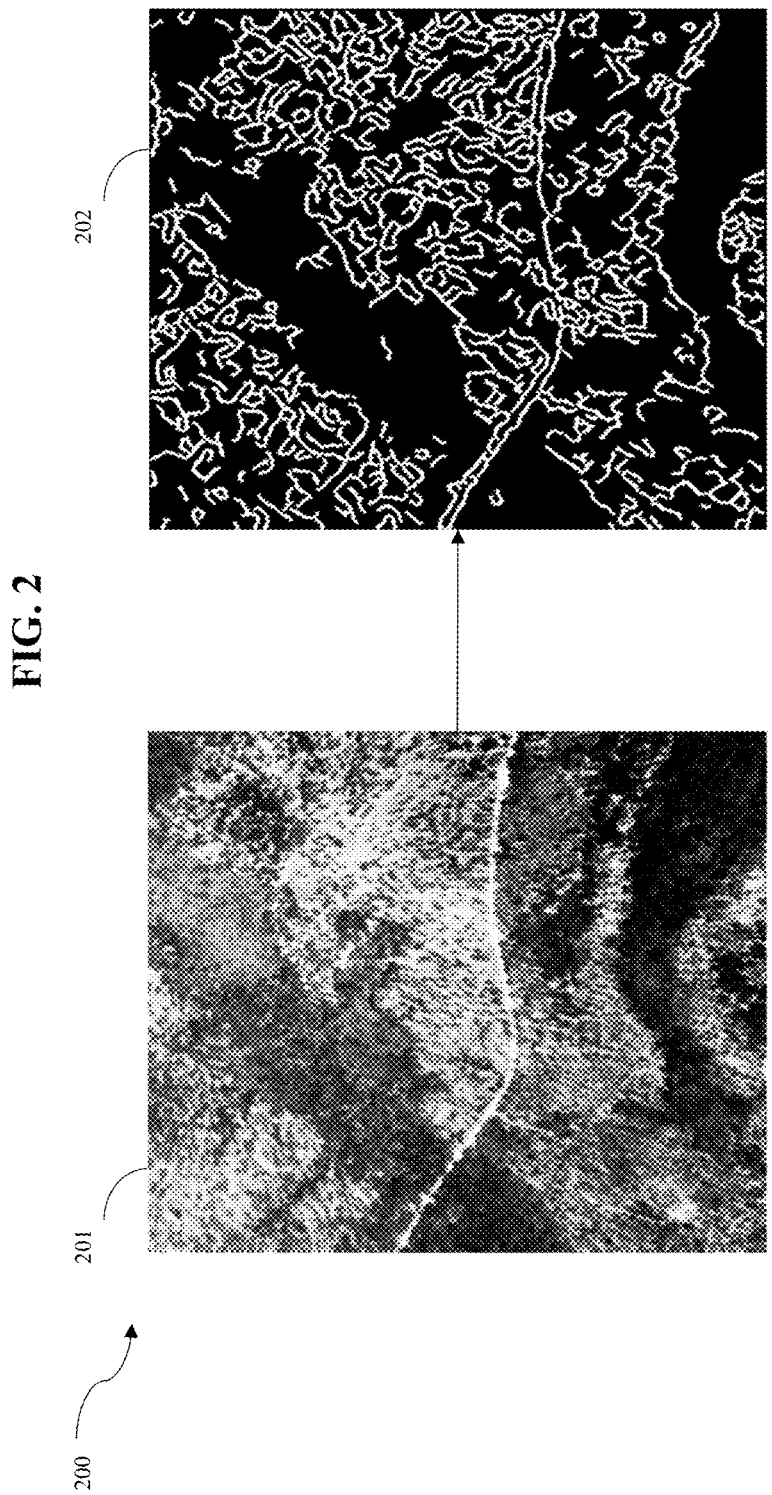
FIG. 2 is a remote sensing image and a remote sensing edge map generated in response to the remote sensing image, according to an embodiment.

FIG. 2 provides a general illustration of generating an edge map from a remote sensing ground image, according to an embodiment. That is, an example of an edge map generated from a ground image is portrayed in FIG. 2. A ground image 201 represents an image acquired via either a satellite or an image-capture device, for example a camera, onboard an aircraft. An edge map 202 represents edges (illustrated as white lines in the edge map 202) of significant features of the ground image 201, such features including roads, buildings, and rivers, the edges detected by a circuit, such as a microprocessor or microcontroller, executing image-processing software to implement an embodiment of an edge-detection technique as described below.

Figure 3:
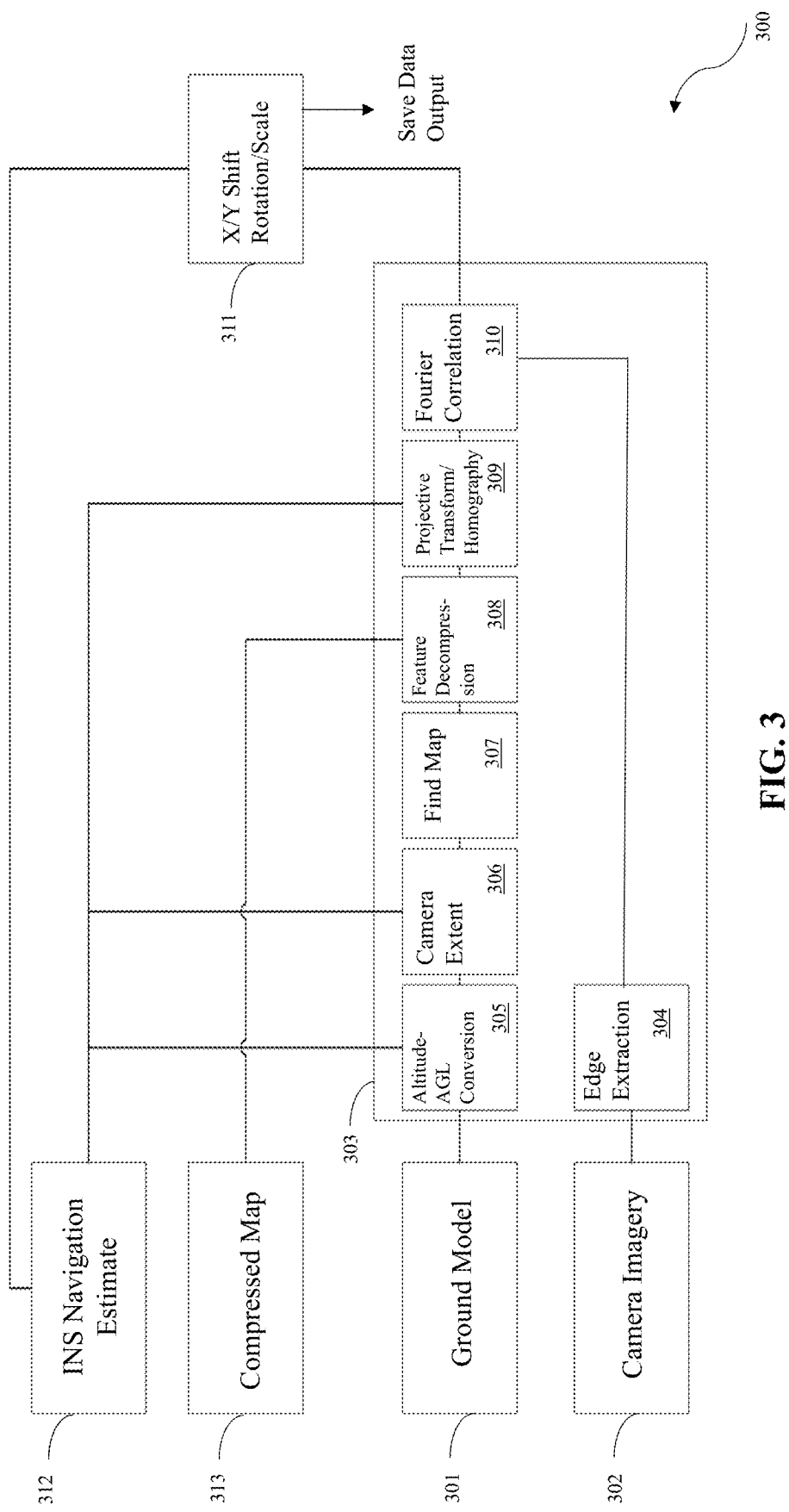
FIG. 3 is a flow chart of a correlation algorithm for comparing edge features in a remote sensing-model image to the edge features extracted from an acquired image, according to an embodiment.

An embodiment for generating an edge map database of one or more image portions of a georeferenced, orthorectified database image are described in conjunction with FIGS. 3-5.

FIG. 3 is a diagram 300 of an algorithm for generating an edge map, such as the edge map 202 of FIG. 2, from an acquired image of a region of ground, such as the acquired image 201 of FIG. 2, according to an embodiment. The algorithm can be executed, or otherwise performed, by a hardware circuit configured by firmware or executing software-program instructions stored on non-transitory computer-readable media such as non-volatile memory.

FIG. 4 are diagrams demonstrating the extent of a vehicle image-capture device, such as a camera, and how it relates to an image plane of the camera.

FIG. 5 is a flow diagram 500 of a process for acquiring a georeferenced, orthorectified-database image using navigation data obtained by the vehicle and based on the camera of the vehicle image-capture device, normalizing one or more image portions of the database image, and generating an edge map of the normalized database image.

At a step 501, the ground image, which was acquired a priori from an image-capture device (e.g., a camera onboard a satellite and not shown in FIGS. 2-3), is obtained from, for example, a database. The database includes associated position data that is used to describe the location (e.g., reference point) in which the image was taken, such as a georeferenced, orthorectified imagery database. For ease of explanation, such a database will be referred to as a remote sensing database. The image-capture device can be, or can include, for example, any optical or electromagnetic sensor, or a camera. For illustrative purposes, although it is assumed hereinafter that the terrain image is acquired via an unmanned aerial vehicle (e.g. satellite), the ground image may also be acquired via other means.

At a step 502, one or more image portions are extracted from the ground image, each of the one or more image portions having approximately the same extent of a vehicle image-capture device, such as a camera, other optical sensor, or other electromagnetic sensor). The vehicle image-capture device may be located on, within, or mounted to the vehicle. For illustrative purposes, the vehicle image-capture device is described as a camera.

Referring to FIGS. 3-4, selecting a portion of a ground image 501 such that the portion approximates the extent of the vehicle image-capture device is described, according to an embodiment. Said another way, extracting, from the ground image 201, the appropriate image portion size of the ground image(s) so that the image portion matches the extent of the vehicle image-capture device.

Referring now to FIG. 3, which is a diagram 300 of an algorithm that one can use to execute the flow diagram of FIG. 5, an INS navigation estimator 312 estimates the vehicle's altitude.

Next, a height-AGL converter 305 converts the determined altitude to an estimated height-above-ground level (AGL) measurement via a ground model 301. For example, if the vehicle's estimated altitude is 10,000 feet, but the ground model shows that the vehicle is located over a 1000-foot-above-sea-level plateau, then the vehicle's height above ground level is 10,000 feet–1000 feet~9000 feet. Altitude as used herein means the vertical distance between the vehicle and sea level, and height above ground level means the vertical distance between the vehicle and the section of ground below the vehicle. Therefore, the ground model 301 includes elevations of land and man-made formations that form, or that are otherwise part of, the terrain. As described above, height AGL is determined by subtracting the height of the vehicle above the land elevation from the altitude of the vehicle.

Then a camera-extent calculator 406 calculates the extent 404 of the camera onboard the vehicle in response to the estimated height AGL of the onboard camera and the known (typically rectangular) dimensions of the camera's image sensor and the focal length of the camera's lens. Said another way, the calculator 406 can determine the extent of the camera in response to the height AGL and the camera's field of view (sometimes called field of regard). Camera extent as used herein means the dimensions of the portion of the ground that appears in an image of the terrain captured by the onboard camera. For illustrative purposes, the portion of the ground of which the camera captures an image is assumed to be flat, i.e., planar, though the camera-extent determiner 306 also can calculate the camera extend for terrain that is not flat.

Figure 4B:
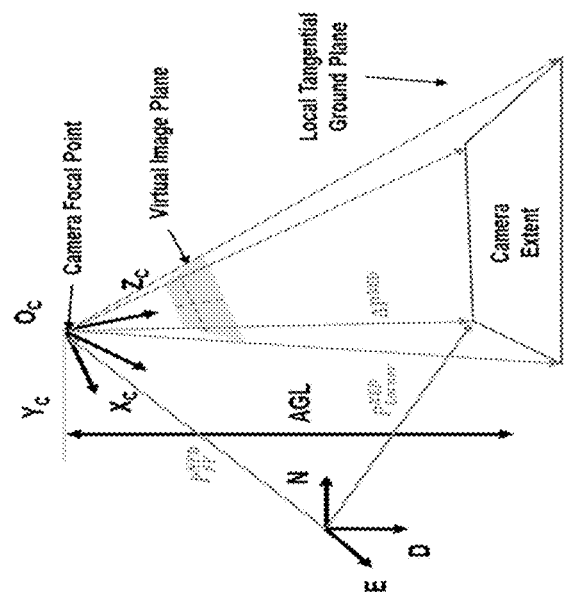
FIGS. 4A and 4B are diagrams that illustrate determining the camera extent of a camera onboard the aircraft at various angles, according to an embodiment.
Figure 4A:
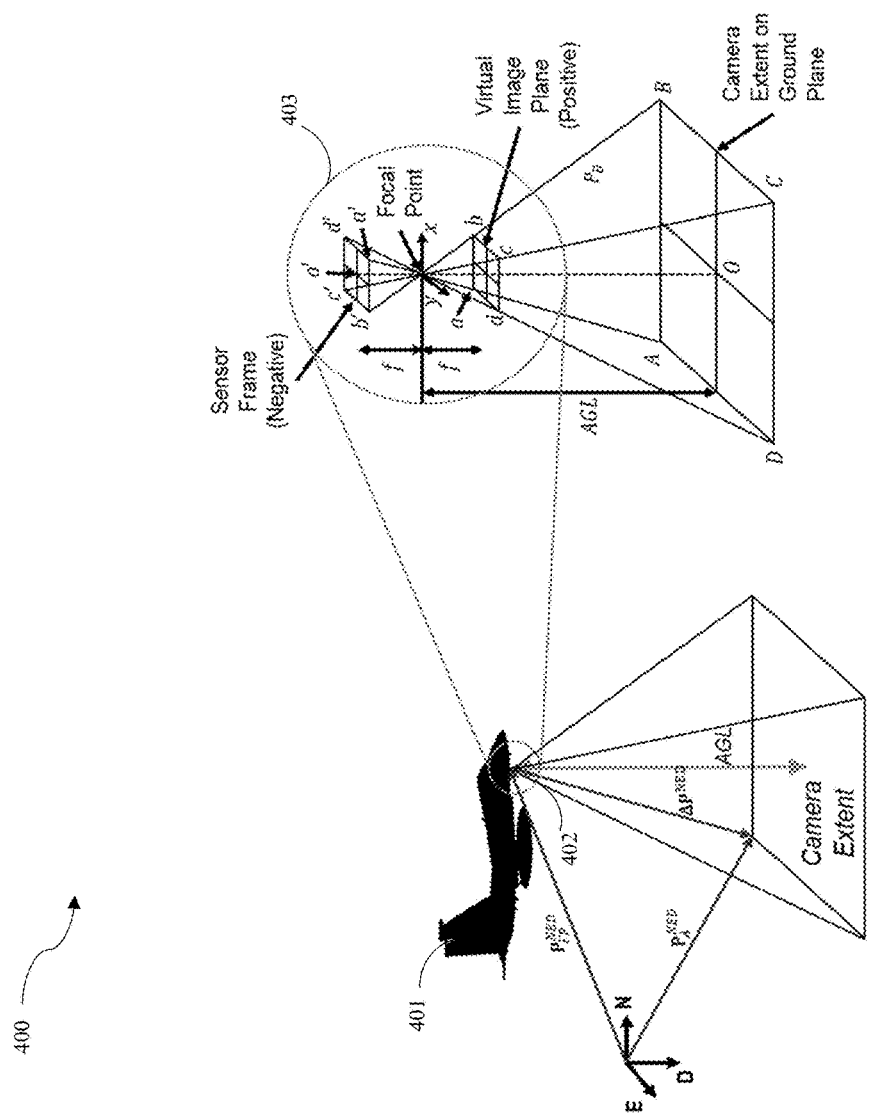

FIG. 4 illustrates an example calculation of the camera extent that the camera-extent determiner 306 is configured to perform. FIG. 4A displays a situation in which the camera onboard the vehicle is parallel to the ground plane, while FIG. 4B displays the situation where the camera is positioned at an angle relative to the ground; however, one with ordinary skill in the art will recognize that the mathematical principles described with respect to FIG. 4 apply or can be modified in both situations. The camera extent 404 of the camera 402 onboard vehicle 401 is represented by the shaded rectangle, which forms the base of a rectangular pyramid. Camera 402 is positioned at the bottom of vehicle 401, though camera 402 can be mounted to vehicle 401 in other ways (e.g. on the tail, wing, or fuselage of vehicle 401). Image plane 403 corresponds to the "active" planar area of the camera's pixel-array sensor that is configured to capture the incident light from which the camera generates the pixels that form the captured image (it is assumed that the camera is a digital camera), which is magnified in at FIG. 4 for clarity. By using the similar triangles theorem, the camera corners can be projected onto the ground plane. Using principles of Euclidean geometry, the scope of the camera field-of-view can be determined by the following equation (hereinafter "Equation 1"):

$$P_{Corner}^{NED} = AGL * \frac{\Delta P_{Corner}^{NED}}{u_z^T \Delta P_{Corner}^{NED}} + P_{FP}^{NED}$$

where $P_{Corner}^{NED}$ is the camera corner as projected onto the ground in the NED reference frame, AGL is the altitude above ground level, $\Delta P_{Corner}^{NED}$ is the vector from the camera focal point to the camera corner in the NED frame, $u_z$ is the unit column vector in the z axis, and $P_{FP}^{NED}$ is the origin of the camera coordinate frame, which corresponds to the camera focal point. $\Delta P_{Corner}^{NED}$ is determined by the following equation:

$$\Delta P_{Corner}^{NED} = R_{Camera}^{NED} * K^{-1} * P_{Corner}^{VIP}$$

where $R_{Camera}^{NED}$ is the rotation from camera coordinate frame to NED coordinate frame, K is the camera intrinsic matrix obtained during camera calibration, and $P_{Corner}^{VIP}$ is the camera corner in the image reference frame (in pixels). An example camera intrinsic matrix K, and its associated inverted matrix, can be illustrated as:

$$K = \begin{bmatrix} f_x & s & c_x \\ 0 & f_y & c_y \\ 0 & 0 & 1 \end{bmatrix}, K^{-1} = \begin{bmatrix} \frac{1}{f_x} & -\frac{s}{f_x f_y} & \frac{c_y z - c_x f_y}{f_x f_y} \\ 0 & \frac{1}{f_y} & -\frac{c_y}{f_y} \\ 0 & 0 & 1 \end{bmatrix}$$

where $f_x$ and $f_y$ are the x and y focal lengths in pixels, s is a skew value (generally equivalent to zero), and $c_x$ and $c_y$ is the principal point (i.e., optical axis intersection with the image plane). The four camera corner values ($P_{Corner}^{VIP}$) can also be represented by a matrix, for example, the matrix illustrated below:

$$\begin{bmatrix} x_c \\ y_c \\ 1 \end{bmatrix} = \begin{bmatrix} 0 & w-1 & w-1 & 0 \\ 0 & 0 & h & h \\ 1 & 1 & 1 & 1 \end{bmatrix}$$

where $x_c$ and $y_c$ are the x and y axis values of each of the four camera corners, w is the width (length in x coordinates) of the camera, and h is the height (length in y coordinates). Ultimately, the camera extent can be used to determine the ground sample distance of the image acquired by the vehicle image capture device, which can be further compared with the georeferenced, orthorectified database image as described in further detail below. Once the camera extent has been determined, one or more portions of the ground image 201 are extracted to have dimensions matching the camera extent of camera 402.

Referring back to FIG. 5, process 500 continues to a step 503, where the portion(s) of the ground image 201 that has the determined camera extent is normalized based on a parameter of the image portion. Normalization can include normalizing the GSD of the captured image to the GSD of the database image, so that images of like GSD are compared, if the captured and database images do not already have approximately the same GSD. Furthermore, for example, the image portion can be normalized by the contrast (e.g. the differences in light and color) of the image portion based on techniques known in the art. The size of each pixel in an image depends on the spatial resolution of the image, which in turn depends on the height of the vehicle that captured the image. Thus, normalizing an image can provide greater clarity of the image, which can aid in identifying edge features for edge map generation.

However, the effectivity of normalization largely depends on the contrast of the region that is normalized, due to the difference in gradient magnitude over the normalization area. As the variance of contrast of the normalized area decreases, the detection of edges similarly decreases. Thus, in a region that includes both high contrast and low contrast portions, normalization over the entire region will accentuate only the high contrast portions, which can lead to a lower quality edge map. However, if the region is further subdivided such that the high and low contrast portions are separated into different image portions, and normalization is performed for each portion separately, then contrast variance can be evaluated separately for each image portion. By normalizing over smaller image portions, smaller variances in contrast can be accentuated, which ultimately means more edges can be detected, thus improving the quality of the edge detection process.

Figure 9B:
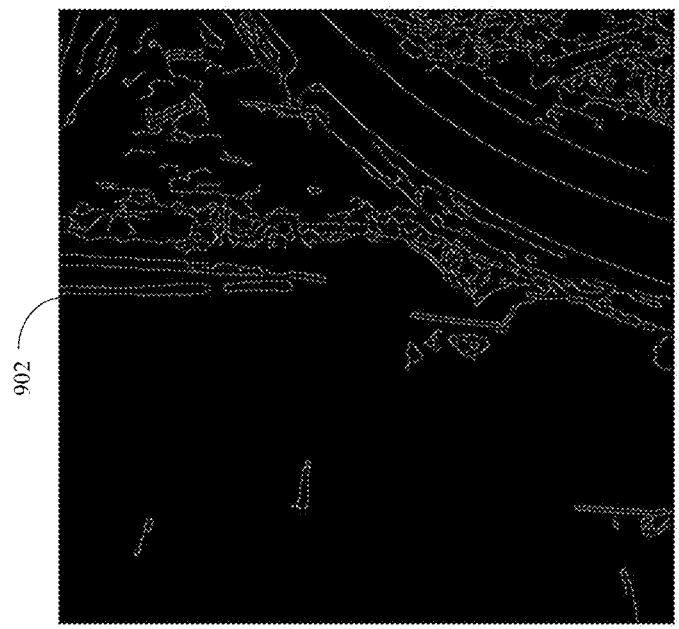
FIGS. 9A and 9B are, respectively, an edge map normalized over the entire image generated from an acquired image of a region of terrain, and an edge map of the same acquired image normalized over one or more window grids, according to an embodiment.
Figure 9A:

This relationship is illustrated in FIG. 9, which shows two generated edge maps 901 and 902 (FIGS. 9A and 9B, respectively) from remote sensing images that have been normalized. FIG. 9A displays an edge map 901 where the input image has been normalized over a large area (for example, over the entirety of the image). As a result, smaller edges may be diminished or eliminated altogether, which may result in a distorted or lesser quality edge map. In contrast, FIG. 9B displays an edge map 902 in which the input image is sectioned into grids of sub-images and normalization is performed on each sub-image. Because normalization is performed over a smaller variance in contrast, the generated edge map shown at 902 contains increased edge features. Thus, normalization is performed over the remote sensing image in smaller sub-images such that more edge features can be detected. The size of each sub-image may be the matching dimensions of the vehicle camera 402 but may also be bigger or smaller depending on the precise embodiment.

Referring back to FIG. 5, one or more edges are detected from the normalized image portion(s) from the georeferenced, orthorectified database at step 504. Edge detection can be realized through techniques known in the art, but in one embodiment, edge detection is realized using a modified Canny edge-detection algorithm.

At a step 505, an edge map is generated based on the detected one or more edges of the normalized image portion from the georeferenced, orthorectified database.

Process 500 ends at step 506, where the edge map is stored in a database (e.g. in a second remote sensing database) for future use, such as for correcting navigation estimation data as further described below. The second remote sensing database thus includes edge maps generated from normalized images acquired from the first remote sensing database described above. Until retrieval, the edge map can be stored in a compressed file format, such as a portable network graphic (PNG) file.

FIGS. 3-4 and 6-10 describe techniques for implementing the second set of embodiments. These embodiments relate to processing an image acquired by an image-capture device (e.g. camera) coupled to (e.g. mounted on) a vehicle, such as an aircraft, to generate an edge map of the image. Additionally, a second edge map generated a priori, for example according to the above-described first set of embodiments, is retrieved from a remote sensing image database, for example, the second remote sensing database, and compared with the edge map of the image acquired via the vehicle image-capture device. The generation of the first edge map (from the image acquired by the vehicle camera) is done by adjusting one or more terms, e.g., coefficients or other parameters, of an edge-detection algorithm, for example Canny edge detection, such that the terms correspond to a ratio of the ground sample distance of the database image and the image acquired by the vehicle camera. From there, the two edge maps are compared to determine one or more navigation parameters of the vehicle, which can be used to correct initial navigation estimates in times where other position determining information (such as GPS data) is unavailable.

Figure 6:
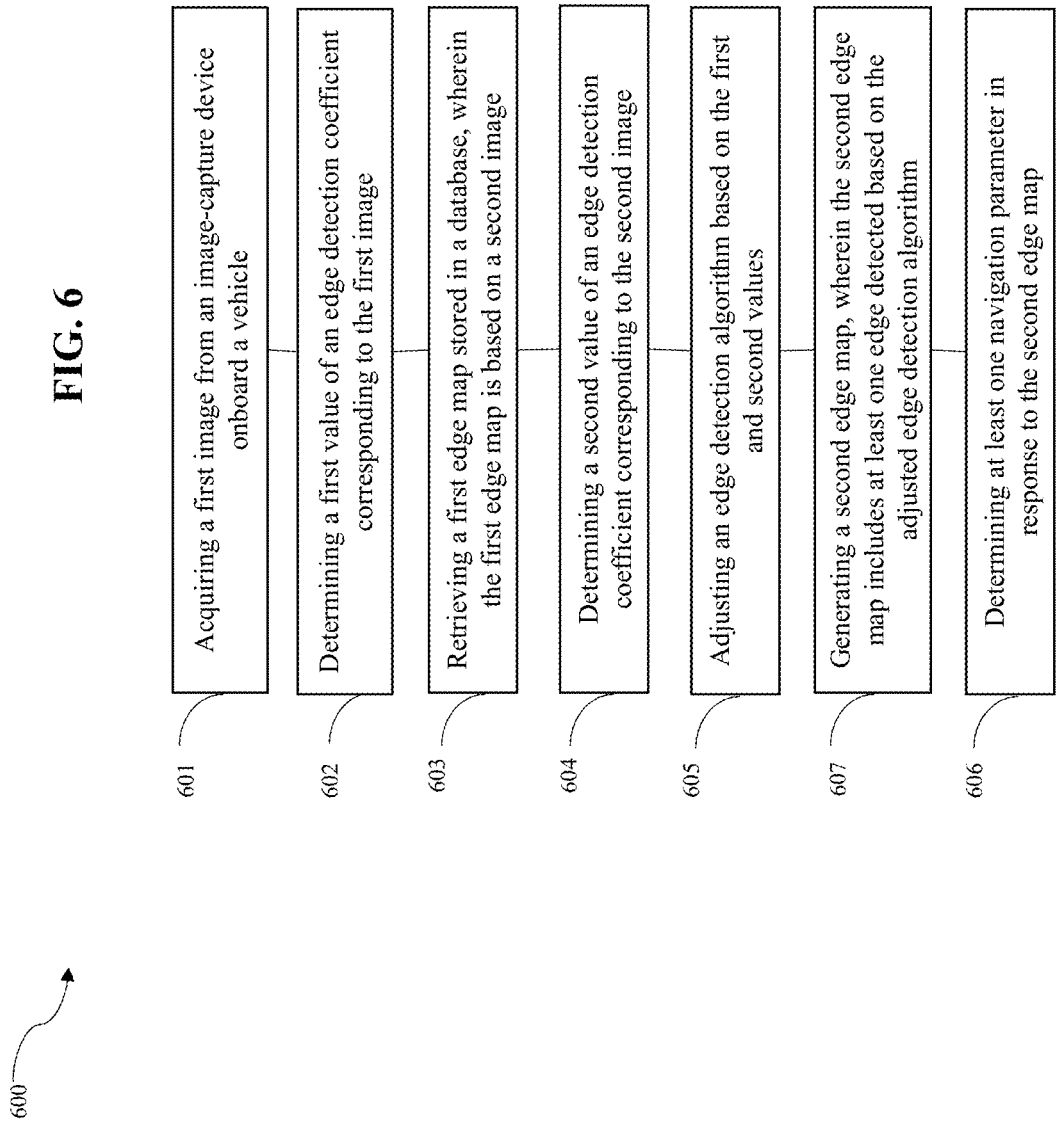
FIG. 6 is a flow chart of a process for adjusting one or more parameters of an edge-detection algorithm based on a ratio of the spatial resolutions of a remote sensing image and a camera image, according to an embodiment.

FIG. 6 is a flow diagram 600 of a process for determining at least one navigation parameter from two compared edge maps corresponding to a vehicle location. As with respect to FIG. 5, the process represented by the flow diagram 600 is meant to be construed as illustrative and not intended to be limiting; thus, some steps in flow diagram 600 may be performed out of the described sequence.

Referring to FIG. 6, at a step 601, an image is acquired from an image-capture device (e.g. camera) onboard a vehicle. In this example, the acquired image is of the area below the vehicle. The image acquired by the vehicle image-capture device has a corresponding ground sample distance.

Then, at a step 602, circuitry, such as a microprocessor or microcontroller of a navigation system, determines a first value of an edge-detecting algorithm coefficient in response to the image acquired via the vehicle image capture device. The first value relates to an intrinsic feature of the image. For example, in an embodiment, the first value relates to the ground sample distance of the image. If Canny edge detection is performed on the image (as described in further detail below), then the coefficient is a sigma (σ) value of the image based at least in part on the first value, wherein the sigma value is a gaussian blur factor intrinsic to the vehicle-acquired image.

Proceeding to a step 603, an image (edge) map is acquired, where the edge map is based on a second image acquired by a second image-capture device. For purposes of illustration, the second image-capture device can be a camera mounted a remote sensing vehicle (e.g. satellite), but other image sensors and vehicles may be used to acquire the second image. The edge map image may be retrieved from the second remote sensing database described above, but other edge map databases may be used. The retrieval of the edge map is made based on the current position of the vehicle. Referring back to FIG. 3, INS navigation estimator 312 (from an INS/IMU) provides an initial estimate of the vehicle's position, which is then used to calculate the altitude of the vehicle as described above. The altitude measurement is converted to a height AGL measurement using the land elevation data provided by ground model 301, and the camera extent of the vehicle image capture device is calculated based on the computed AGL measurement using the techniques described with respect to FIG. 3. Once the camera extent of the vehicle image capture device has been determined, the algorithm 300 acquires an edge map with approximately the same extent as the determined camera extent at block 307.

Once acquired, the first generated edge map may undergo further processing to match the dimensions of the extent of the vehicle image-capture device (e.g. camera FOV). Still referring to FIG. 3, if the retrieved edge map has been saved in a compressed format, a feature decompressor 308 decompresses the compressed map 313. In the case where the decompressed edge map does not fully match the camera extent of the vehicle image capture device, then additional edge maps or portions of edge maps stored in the edge map database may be synthesized to match the camera extent. Thus, after optional feature decompression, the projective transformer 309 can be configured to transform the edge map portions onto the camera FOV. Alternatively, the dimensions of the camera extent could be imposed on the edge map, for example via an inverse projective transformation. The generated edge map (now having dimensions that match the vehicle camera FOV) is effectively projected onto the FOV of the vehicle camera so as to align the database edge map and the edge map corresponding to the image captured by the vehicle camera.

Referring back to FIG. 6, at a step 604 a second value of an edge detection algorithm coefficient corresponding to the first generated edge map is determined. The second value relates to an intrinsic feature of the image. For example, in one embodiment, the second value relates to the ground sample distance of the image. If Canny edge detection is performed on the image, then the coefficient is a sigma (σ) value of the image that is based at least in part on the second value.

Process 600 then continues to a step 605, where an edge detection algorithm is adjusted based on the first and second values of the edge detection coefficient. In an embodiment, the first and second values correspond to ground sample distances of the respective images, and the edge detection algorithm is adjusted based on the ground sample distances. For example, the edge detection algorithm can be a Canny edge detection algorithm, and the edge detection coefficient corresponds to sigma (σ) values of the first generated edge map and the image acquired by the vehicle image capture device. The edge detection algorithm can then be adjusted by a ratio of the sigma values given by the following equation (hereinafter "Equation 2"):

$$\sigma_{camera} = \frac{GSD_{map}}{GSD_{cam}} \sigma_{map}$$

where $\sigma_{camera}$ is the Gaussian blur sigma coefficient to be used to generate an edge map of the vehicle camera image, $\sigma_{map}$ is the Gaussian blur sigma coefficient used to generate an edge map of the satellite map image, $GSD_{cam}$ is the ground sample distance of the vehicle camera, and $GSD_{map}$ is the ground sample distance of the satellite. Because satellite edge maps can be at predetermined GSDs (e.g., 0.5 m², 1 m², 2 m², 4 m², and 8 m² pixel sizes) for different airplane altitudes, and because the vehicle may be at an altitude that renders an image resolution in between the satellite edge map resolutions, $\sigma_{camera}$ for the Canny Gaussian filter used to generate an edge map in response to the camera image is scaled relative to $\sigma_{map}$ to give more compatibility between edges extracted from the camera image and edges extracted from the remote sensing database image. Accordingly, the embodiments disclosed herein need not require equal coefficient values, and thus ground sample distance, between the compared images. Even if the ground sample distances are not equal, scaling the one or more terms of the edge-detection algorithm increases the compatibility of the edges detected in the vehicle-acquired image with the edges in the stored database image.

Once the edge detection algorithm has been adjusted, the adjusted edge detection algorithm can then detect edges in the vehicle acquired image. Referring now to FIG. 3, edge extractor 304 is configured to detect edges using the adjusted edge detection algorithm on the camera image 302. Then, a Fourier correlator 310 is configured to perform conventional Fourier correlation to compare edge features in the first generated edge map to the edge features extracted from the camera image. A second edge map is generated based on the extracted edge features, which is illustrated in FIG. 6 at a step 607. From there, a shifter/rotator/scaler circuit 311 is configured to estimate vehicle position data based on the second edge map. The circuit 311 is configured to align the edge map generated from the acquired image with the edge map generated from the remote sensing image to see if the edges from both maps "line up" with one another. The position estimation can then be stored (e.g. in memory circuitry) for further processing.

Referring now to FIG. 6, process represented by the flow diagram 600 terminates after a step 606, during which circuitry (e.g., a microprocessor or microcontroller) of a navigation system computes, corrects, or both computers and corrects at least one navigation parameter in response to the comparison of the first, remote sensing database edge map, and the second, vehicle-camera-image edge map. For example, the circuitry uses data from the comparison of the edge maps to correct initial estimates of navigation position information that were estimated, e.g., with a Kalman filter, and possibly to update the estimation algorithm, e.g., to update one or more coefficients of the Kalman filter matrices. Such navigation information (e.g. parameters) include lateral position data (pitch, roll, yaw), heading, altitude, or movement (velocity and acceleration) of the vehicle.

Figure 7:
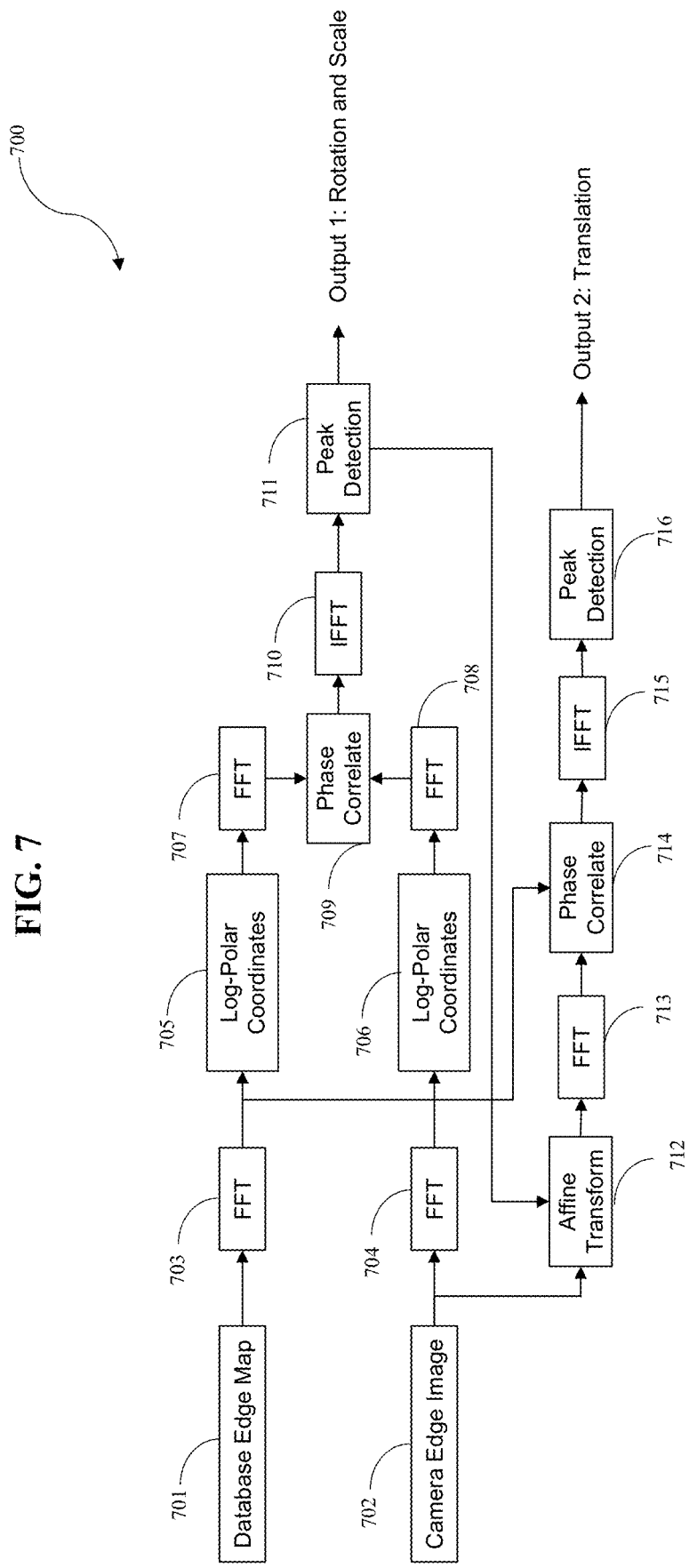
FIG. 7 is a block diagram of a comparison algorithm for comparing edge features of a georeferenced ortho-rectified satellite image and a camera image to correct navigation data, according to an embodiment.

One embodiment of a circuit configured to implement a comparison algorithm for comparing edge features of a remote sensing image and a camera image to determine and/or correct navigation data is illustrated in FIG. 7. The circuit 700 is configured to implement an algorithm that transforms database edge image 701 and camera edge image 702 to the frequency domain via transformers 703 and 704, respectively. The coordinates are expressed as log-polar coordinates in the frequency domain (by circuits 705 and 706) before a second set of fast Fourier transforms via transformers 707 and 708. A phase correlator 709 then performs a phase correlation algorithm (described further in FIG. 8) to the outputs of 707 and 708, followed by an inverse fast Fourier transform at transformer 710. Next, a filter and peak detector 711 compares the output of transformer 710 with the output from transformer 703, filters the two inputs, and identifies peaks corresponding to the waveforms. Filter and peak detector 711 is further configured to generate a first output, shown as output 1, in response to the comparison. Output 1 represents correction estimates to rotation and scale navigation parameters.

Still referring to FIG. 7, the camera edge image 702 (and the output of peak detector 711) are input into transformer 712, which is configured to perform an affine transform. A transformer 713 performs a fast Fourier transform on the camera edge image, which is input into phase correlator 714 along with the output from transformer 703. The output is fed into transformer 715, which is configured to perform an inverse fast Fourier transform. A filter-and-peak detector 716 enhances the edges of the output from transformer 715, and outputs this enhanced edge map as a second output, shown as output 2, which represents correction estimates to translation navigation parameters. When a magnitude of a spatial difference between output 1 and output 2 is at a minimum, this indicates alignment of the camera edge map with the database edge map. Therefore, the circuit 700 is configured to operate on different orientations of the camera edge map 702 or of the database edge map 701 until a minimum spatial difference is found.

Figure 8:
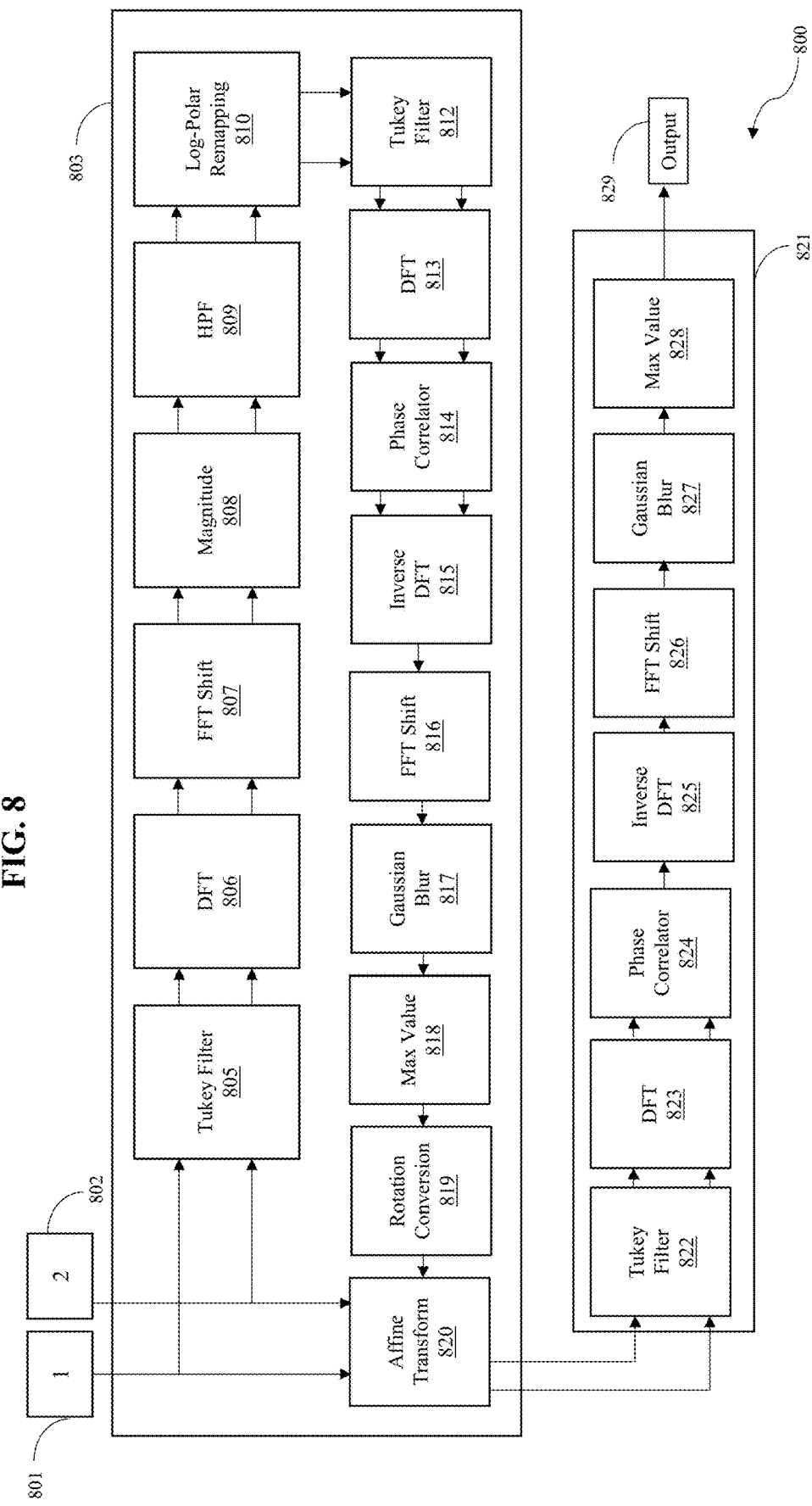
FIG. 8 is a flow chart of a comparison algorithm for comparing edge features of a georeferenced ortho-rectified satellite image and a camera image to correct navigation data, according to an embodiment.

A second exemplary embodiment of a circuit configured to implement a comparison algorithm for comparing edge features of a remote sensing image and a camera image to correct navigation data is illustrated in FIG. 8. Comparison circuitry 800 can be configured to implement the steps of a Reddy algorithm or of another conventional algorithm. The circuit 800 includes rotation-and-scale-estimator circuit 803, which is configured to extract the rotation (e.g. heading) and scale (e.g. altitude) data from the remote sensing edge map (shown stored in a memory 802) and the edge image generated in response to the vehicle-camera image (shown stored in memory 801). Circuit 800 also includes translation correlator circuit 821. As shown in FIG. 8, the circuitry 800 includes Tukey filter 805, discrete Fourier transformer 806, fast Fourier transform shifter 807, magnitude calculator 808, high-pass filter 809, and log-polar remapper 810. The partially processed edge maps are then processed by another Tukey filter 812, discrete Fourier transformer 813, phase correlator 814, inverse discrete Fourier transformer 815, fast Fourier transform shifter 816, Gaussian blur 817, and maximum-value determiner 818. After a rotation converter 819 and affine transformer 820 further process the signal(s) output from the max-value determiner 818, the processed images then undergo further processing through translation correlator circuit 821, which includes another Tukey filter 822, another discrete Fourier transformer 823, phase correlator 824, inverse discrete Fourier transformer 815, fast Fourier transform shifter 816, Gaussian blur 817, and maximum-value determiner 818. An output circuit 820 is configured to then generate an output 829 indicative of updated navigation information (e.g. rotation, scale, and/or translation parameters) that can be used to correct initial inertial navigation measurements and values.

FIGS. 9A and 9B are described above.

Figure 10:
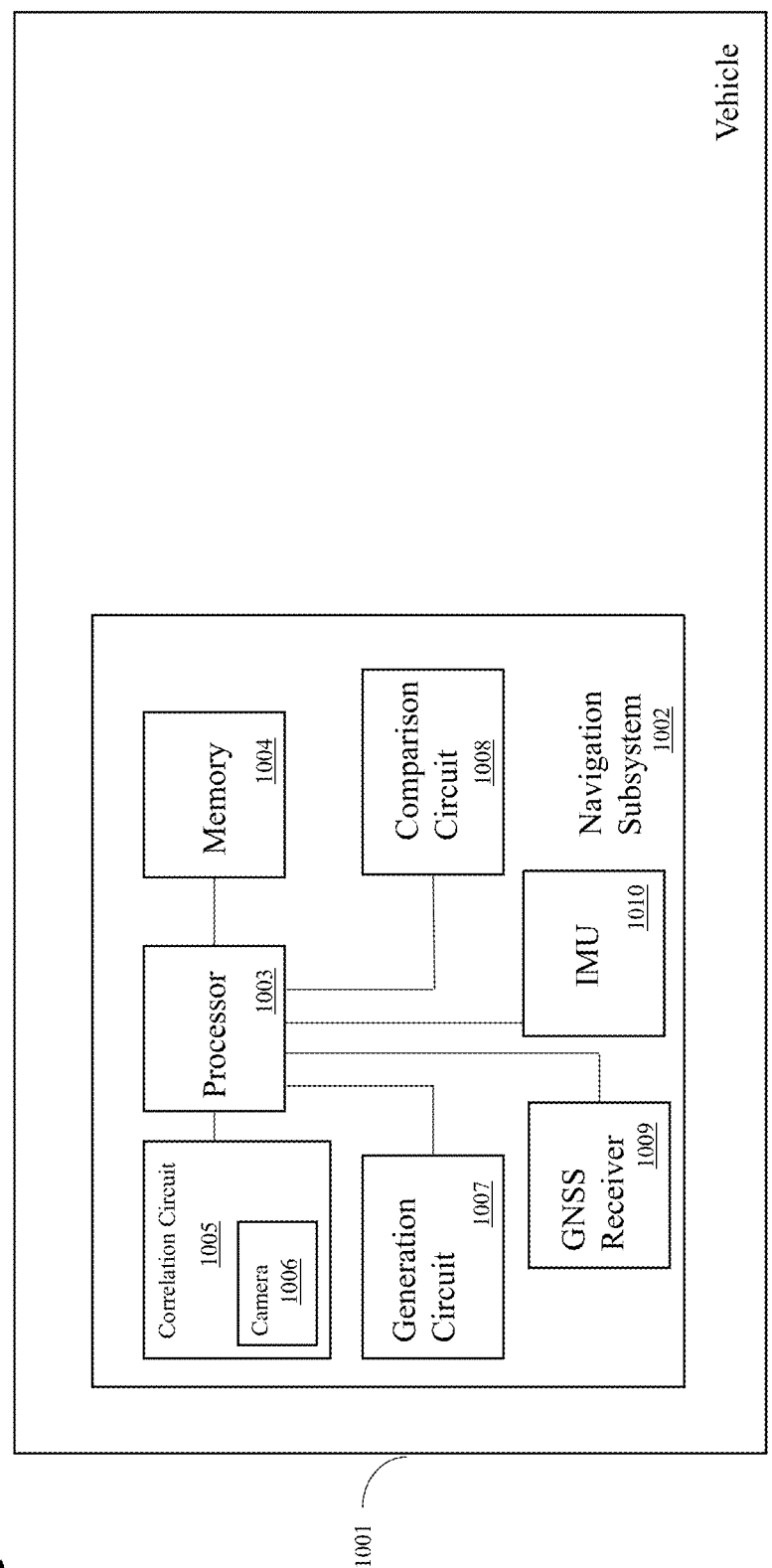
FIG. 10 is a block diagram of vehicle that includes a navigation subsystem configured for adjusting one or more parameter of an edge-detection algorithm based on the ratio of the spatial resolutions of a remote sensing image and a camera image, according to an embodiment.

FIG. 10 is a diagram of a system 1000, which includes a vehicle 1001 and a navigation subsystem 1002, according to an embodiment. The navigation subsystem 1002 can include one or more of the circuits 300, 700, and 800 of FIGS. 3, 7, and 8, respectively, or any other suitable circuit, configured to implement an embodiment of the above-described algorithm (e.g., as described by the flow diagrams 500 and 600 of FIGS. 5-6) for determining a navigation parameter in response to a comparison of a database edge map to an edge map generated in response to an image captured with a camera, or other image-capture device, onboard the vehicle 100, for example, an aircraft. The vehicle 1001 may be any type of land, air, space, water, mobile, or other class of vehicle. Vehicle 1001 includes navigation subsystem 1002, which is configured for receiving, sending, or displaying navigation data. Navigation subsystem 1002 includes GNSS receiver 1009 for receiving GNSS data/images and inertial measurement unit 1010 for measuring vehicle position and calculating an initial estimation of vehicle position. Processor 1003 is coupled to memory 1004 and correlation circuit 1005, generation circuit 1007, and comparison circuit 1008. Memory 1004 is configured to store navigation data and may also store a terrain database of terrain images for estimating the AGL below a vehicle. Memory 1004 may also be configured to store edge maps generated from georeferenced orthorectified remote sensing imagery (e.g. remote sensing database) for comparison to edge images acquired by a camera onboard the vehicle. Although three separate circuits are described in system 1000, the separate functions described with respect to each circuit may be integrated into one circuit or further differentiated into one or more additional circuits. Thus, the discrete functions of each circuit are described for ease of description only and not intended to be limiting.

The circuitry presented in navigation subsystem 1002 is designed to perform the scaling, comparing, and other functions as described above. Specifically, correlation circuit 1005 includes circuitry configured to identify the respective ground sample distances of the remote sensing database image and vehicle-acquired image used to scale the coefficients (e.g. Gaussian blur sigma) of the edge detection algorithm. These coefficients may be sigma values input into a Canny edge-detection algorithm, but may also include variables from other such algorithms. Correlation circuit 1005 may also include an image-capture device 1006, which may include a camera or other conventional sensor configured to capture image data. Additionally, correlation circuit 1005 is configured to adjust a parameter of the edge-determining algorithm based on the values of the corresponding coefficients, such as by scaling the sigma values using Equation 2.

Generation circuit 1007 includes circuitry configured to generate at least one edge in response to the adjustment of the edge detection algorithm by correlation circuit 1005. In practice, generation circuit 1007 generates an edge map generated with the modified edge-determining algorithm in response to the vehicle camera image.

Comparison circuit 1008 includes circuitry configured to determine at least one navigation parameter (for example heading, altitude, or position) of the vehicle in response to the compared remote sensing database and vehicle images. Thus, comparison circuit 1008 can use the modified data to perform error calculation and correct the initial estimate of vehicle position calculated by inertial measurement unit 1100. This may be done modifying, for example, a Kalman filter based on the corrected measurements.

EXAMPLE EMBODIMENTS

Example 1 includes a method, comprising: extracting, from an image acquired with a first image-capture device, an image portion having dimensions of an extent of a second image-capture device; normalizing a parameter of the image portion; determining at least one edge of at least one object in the image portion; and generating, in response to the determined at least one edge, an edge map corresponding to the image portion.

Example 2 includes the method of Example 1, wherein the first image-capture device includes a satellite.

Example 3 includes the method of any of Examples 1-2, wherein the second image-capture device is configured to be mounted to an aircraft.

Example 4 includes the method of any of Examples 1-3, wherein the extent of the second image-capture device corresponds to the ground sample distance of the image portion.

Example 5 includes the method of any of Examples 1-4, wherein the extent of the second image-capture device corresponds to a distance between the second image-capture device and an object of which the second image-capture device captures an image.

Example 6 includes the method of any of Examples 1-5, wherein the parameter includes a contrast of the image portion.

Example 7 includes the method of any of Examples 1-6, wherein determining at least one edge further comprises determining at least one edge via a Canny edge-detection algorithm.

Example 8 includes a non-transient computer-readable medium storing instructions that, when executed by a computing circuit, cause the computing circuit, or another circuit under control of the computing circuit: to extract, from an image acquired with a first image-capture device, an image portion having dimensions of an extent of a second image-capture device; to normalize a parameter of the image portion; to determine at least one edge of at least one object in the image portion; and to generate, in response to the determined at least one edge, an edge map corresponding to the image portion.

Example 9 includes the non-transient computer readable medium storing instructions of Example 8, wherein the first image-capture device includes a satellite.

Example 10 includes the non-transient computer readable medium storing instructions of Example 8-9, wherein the second image-capture device is configured to be mounted to an aircraft.

Example 11 includes the non-transient computer readable medium storing instructions of Example 8-10, wherein the extent of the second image-capture device corresponds to the ground sample distance of the image portion.

Example 12 includes the non-transient computer readable medium storing instructions of Example 8-11, wherein the extent of the second image-capture device corresponds to a distance between the second image-capture device and an object of which the second image-capture device captures an image.

Example 13 includes the non-transient computer readable medium storing instructions of Example 8-12, wherein the parameter includes a contrast of the image portion.

Example 14 includes a database, comprising: an edge map including at least one edge of at least one object in an image portion, the edge map having been generated by: extracting, from an image acquired with a first image-capture device, the image portion having dimensions of an extent of a second image-capture device; normalizing a parameter of the image portion; determining the at least one edge of the at least one object in the image portion; and generating the edge map in response to the determined at least one edge.

Example 15 includes the database of Example 14, wherein the first image-capture device includes a satellite.

Example 16 includes the database of any of Examples 14-15, wherein the second image-capture device is configured to be mounted to an aircraft.

Example 17 includes the database of any of Examples 14-16, wherein the extent of the second image-capture device corresponds to the ground sample distance of the image portion.

Example 18 includes the database of any of Examples 14-17, wherein the extent of the second image-capture device corresponds to a distance between the second image-capture device and an object of which the second image-capture device captures an image.

Example 19 includes the database of any of Examples 14-18, wherein the parameter includes a contrast of the image portion.

Example 20 includes the database of any of Examples 14-19, wherein determining at least one edge further comprises determining at least one edge via a Canny edge-detection algorithm.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. In addition, any described component or operation may be implemented/performed in hardware, software, firmware, or a combination of any two or more of hardware, software, and firmware. Furthermore, one or more components of a described apparatus or system may have been omitted from the description for clarity or another reason. Moreover, one or more components of a described apparatus or system that have been included in the description may be omitted from the apparatus or system.

What is claimed is:

1. A method, comprising:
   determining an extent of a second image-capture device, wherein the extent of the second image-capture device represents an area of terrain from an image acquired by the second image-capture device;
   extracting, from an image acquired with a first image-capture device, an image portion having dimensions of the extent of the second image-capture device;
   normalizing a parameter of the extracted image portion to generate a normalized image portion, wherein the parameter of the extracted image portion is normalized such that the parameter of the extracted image portion matches a corresponding parameter of the image acquired by the second image-capture device;

determining at least one edge of at least one object in the normalized image portion; and generating, in response to the determined at least one edge, an edge map corresponding to the normalized image portion.

2. The method of claim 1, wherein the first image-capture device includes a satellite.

3. The method of claim 1, wherein the second image-capture device is configured to be mounted to an aircraft.

4. The method of claim 1, wherein the extent of the second image-capture device corresponds to a ground sample distance of the extracted image portion.

5. The method of claim 1, wherein the extent of the second image-capture device corresponds to a distance between the second image-capture device and an object of which the second image-capture device captures an image.

6. The method of claim 1, wherein the parameter includes a contrast of the extracted image portion.

7. The method of claim 1, wherein determining at least one edge further comprises determining at least one edge via a Canny edge-detection algorithm.

8. A non-transient computer-readable medium storing instructions that, when executed by a computing circuit, cause the computing circuit, or another circuit under control of the computing circuit:

to determine an extent of a second image-capture device, wherein the extent of the second image-capture device represents an area of terrain from an image acquired by the second image-capture device;

to extract, from an image acquired with a first image-capture device, an image portion having dimensions of the extent of the second image-capture device;

to normalize a parameter of the extracted image portion to generate a normalized image portion, wherein the parameter of the extracted image portion is normalized such that the parameter of the extracted image portion matches a corresponding parameter of the image acquired by the second image-capture device;

to determine at least one edge of at least one object in the normalized image portion; and to generate, in response to the determined at least one edge, an edge map corresponding to the normalized image portion.

9. The non-transient computer readable medium storing instructions of claim 8, wherein the first image-capture device includes a satellite.

10. The non-transient computer readable medium storing instructions of claim 8, wherein the second image-capture device is configured to be mounted to an aircraft.

11. The non-transient computer readable medium storing instructions of claim 8 wherein the extent of the second image-capture device corresponds to a ground sample distance of the extracted image portion.

12. The non-transient computer readable medium storing instructions of claim 8, wherein the extent of the second image-capture device corresponds to a distance between the second image-capture device and an object of which the second image-capture device captures an image.

13. The non-transient computer readable medium storing instructions of claim 8, wherein the parameter includes a contrast of the extracted image portion.

14. A database, comprising:

an edge map including at least one edge of at least one object in an image portion, the edge map having been generated by:

determining an extent of a second image-capture device, wherein the extent of the second image-capture device represents an area of terrain from an image acquired by the second image-capture device;

extracting, from an image acquired with a first image-capture device, the image portion having dimensions of the extent of the second image-capture device;

normalizing a parameter of the extracted image portion to generate a normalized image portion, wherein the parameter of the extracted image portion is normalized such that the parameter of the extracted image portion matches a corresponding parameter of the image acquired by the second image-capture device;

determining the at least one edge of the at least one object in the normalized image portion; and generating the edge map in response to the determined at least one edge.

15. The database of claim 14, wherein the first image-capture device includes a satellite.

16. The database of claim 14, wherein the second image-capture device is configured to be mounted to an aircraft.

17. The database of claim 14, wherein the extent of the second image-capture device corresponds to a ground sample distance of the extracted image portion.

18. The database of claim 14, wherein the extent of the second image-capture device corresponds to a distance between the second image-capture device and an object of which the second image-capture device captures an image.

19. The database of claim 14, wherein the parameter includes a contrast of the extracted image portion.

20. The database of claim 14, wherein determining at least one edge further comprises determining at least one edge via a Canny edge-detection algorithm.

* * * * *